United States Patent [19]
Kashiwagi

[11] Patent Number: 5,850,206
[45] Date of Patent: Dec. 15, 1998

[54] SYSTEM FOR RETRIEVING AND DISPLAYING ATTRIBUTE INFORMATION OF AN OBJECT BASED ON IMPORTANCE DEGREE OF THE OBJECT

[75] Inventor: Kouichi Kashiwagi, Tenri, Japan

[73] Assignee: Sharp Kabushiki Kaisha, Osaka, Japan

[21] Appl. No.: 632,359

[22] Filed: Apr. 10, 1996

[30] Foreign Application Priority Data

Apr. 13, 1995 [JP] Japan .................................. 7-088365

[51] Int. Cl.⁶ .................................................. G06F 15/62
[52] U.S. Cl. .......................... 345/112; 345/115; 345/116; 345/145; 345/157; 345/357; 345/428
[58] Field of Search ............................... 345/1, 112, 115, 345/116, 145, 157, 185, 507, 327, 7, 8, 9, 135–172, 357, 428; 364/237.2; 395/118, 119, 133–139, 141; 396/54; 351/210, 211

[56] References Cited

U.S. PATENT DOCUMENTS

| | | | |
|---|---|---|---|
| 4,595,990 | 6/1986 | Garwin et al. | 364/709.11 |
| 4,884,219 | 11/1989 | Waldren | 345/8 |
| 4,920,337 | 4/1990 | Kao | 340/721 |
| 5,241,624 | 8/1993 | Torres | 395/129 |
| 5,367,614 | 11/1994 | Bisey | 345/419 |
| 5,367,625 | 11/1994 | Ishitani | 395/159 |
| 5,420,968 | 5/1995 | Johri | 345/433 |
| 5,448,693 | 9/1995 | Blades et al. | 395/159 |
| 5,463,722 | 10/1995 | Venolia | 395/133 |
| 5,553,211 | 9/1996 | Uotani | 395/135 |
| 5,563,711 | 10/1996 | Sakai et al. | 358/296 |
| 5,565,888 | 10/1996 | Selker | 345/146 |
| 5,572,232 | 11/1996 | Rhodes et al. | 345/115 |
| 5,590,269 | 12/1996 | Doi et al. | 345/326 |

FOREIGN PATENT DOCUMENTS

| | | |
|---|---|---|
| 3-136087 | 6/1991 | Japan . |
| 5-134600 | 5/1993 | Japan . |
| 6-110941 | 4/1994 | Japan . |

*Primary Examiner*—Mark K. Zimmerman
*Assistant Examiner*—Vincent E. Kovalick
*Attorney, Agent, or Firm*—Nixon & Vanderhye P.C.

[57] ABSTRACT

A System for retrieving and displaying attribute information of an object according to the present invention includes: detecting section for detecting an interaction between a user and the system; importance degree determining section for determining an importance degree of the object based on the interaction detected by the detecting section; object determining section for determining whether the attribute information of the object is to be displayed and an amount of the attribute information of the object which is to be displayed in accordance with the importance degree of the object; display layout generating section for generating a display layout for arranging the attribute information of the object in accordance with a result of the determination by the object determining section; and display section for displaying the attribute information of the object based on the display layout.

16 Claims, 5 Drawing Sheets

SYSTEM FOR RETRIEVING AND DISPLAYING ATTRIBUTE INFORMATION OF AN OBJECT BASED ON IMPORTANCE DEGREE OF THE OBJECT

BACKGROUND OF THE INVENTION

1. Field of the Invention

The present invention relates to a system for retrieving a plurality of objects arranged in a two-dimensional or three-dimensional space and displaying attribute information of each of the plurality of objects. More particularly, the present invention relates to a database retrieval system which enables effective and efficient retrieval operations made by a user using two-dimensional or three-dimensional graphics.

2. Description of the Related Art

In the field of computer graphics, several systems have been proposed for displaying a map or a drawing including a plurality of objects on a display screen using two-dimensional (hereinafter referred to as "2D") or three-dimensional (hereinafter referred to as "3D") graphics, and for retrieving information related to the objects which are displayed on the display screen.

For example, Japanese Laid-Open Patent Publication No. 6-110941 shows a data retrieval system for retrieving and displaying information of public mains (e.g., water pipes and gas pipes), and customer information associated with such mains. The system simultaneously displays, in different portions of one display device, both map information representing the public mains and customer information related to a particular public main.

Japanese Laid-Open Patent Publication No. 5-134600 shows a visual map system and method for graphically displaying 2D map data or 3D landscape data. When a user moves a cursor (which is drawn in the graphical representation) with a pointing device or the like so as to select an object in the graphics, the information associated with that object is displayed.

In either one of the above-described conventional techniques, the user selects an object by means of a cursor which is movable in the graphics, thereby obtaining information of the selected object.

However, in the case where a large number of objects are clustered in a certain region, small movement of the cursor results in the selection of a different object. This increases the difficulty in selecting a desired object. Moreover, when the exact position of the desired object is uncertain, in order to obtain the information of the desired object, the user must move the cursor to an estimated position and conduct a "one by one" search for all objects in the vicinity of the estimated position. This leads to the problem of an undesirable prolonged time required for the acquisition of relevant information.

SUMMARY OF THE INVENTION

A system for retrieving and displaying attribute information of an object according to the present invention includes: detecting means for detecting an interaction between a user and the system; importance degree determining means for determining an importance degree of the object based on the interaction detected by the detecting means; object determining means for determining whether the attribute information of the object is to be displayed and an amount of the attribute information of the object which is to be displayed in accordance with the importance degree of the object; display layout generating means for generating a display layout for arranging the attribute information of the object in accordance with a result of the determination by the object determining means; and display means for displaying the attribute information of the object based on the display layout.

In one embodiment of the invention, the detecting means detects movements of a viewpoint and a gazing point, the importance degree determining means changes the importance degree of the object in accordance with the detected movements of the viewpoint and the gazing point.

In another embodiment of the invention, the detecting means detects retrieval information, the importance degree determining means changes the importance degree of the object in accordance with the detected retrieval information.

In still another embodiment of the invention, the importance degree determining means determines the importance degree of the object as A function of a distance between the gazing point and the object.

In still another embodiment of the invention, the function is given as a function of a distance between the viewpoint and the gazing point.

In still another embodiment of the invention, the importance degree determining means determines the importance degree of the object as a function of an importance degree of at least one object relating to the object.

In still another embodiment of the invention, the display layout generating means generates information for changing a size of a region in which the attribute information of the object is to be displayed in accordance with the amount of the attribute information of the object determined by the object determining means.

In still another embodiment of the invention, the display layout generating means generates information for changing a manner in which the object is to be displayed in accordance with whether the attribute information of the object is to be displayed, and the display means displays the object in accordance with the manner.

In still another embodiment of the invention, the display layout generating means generates information for changing a color of the object in accordance with whether the attribute information of the object is to be displayed.

In still another embodiment of the invention, the display layout generating means generates information for blinking the object whose attribute information is to be displayed.

In still another embodiment of the invention, the display layout generating means generates information for displaying the object whose attribute information is to be displayed, exclusive of the object whose attribute information is not to be displayed.

The detecting section detects an interaction between a user and the system. For example, the interaction includes movements of a viewpoint and a gazing point. Such movements are detected by obtaining a direction and amount of the movements.

The importance degree determining section determines an importance degree of the object based on the interaction detected by the detecting section. For example, the importance degree of the object is determined as a function of a distance between the cursor indicating the gazing point and the object arranged in the 2D or 3D graphics and/or a zooming degree of the graphics.

The object determining section determines whether the attribute information of the object is to be displayed in accordance with the importance degree of the object.

The object determining section also determines an amount of the attribute information of the object which is to be displayed in accordance with the importance degree of the object. For example, as the object has greater importance degree, the object determining section determines a larger amount of the attribute information of the object. As the object has lesser importance degree, the object determining section determines a smaller amount of the attribute information of the object.

The display layout generating section generates a display layout for arranging the attribute information of the object in accordance with the amount of the attribute information of the object determined by the object determining section. The display layout may include graphics including information for changing a manner in which the object is to be displayed in accordance with whether or not the attribute information of the object is to be displayed.

The display section displays the attribute information of the object based on the display layout. The display section may display the object on a portion different from a portion on which the attribute information of the object is displayed.

Thus, in response to the manipulation of the 2D/3D graphics by the user, the object having greater importance is displayed with a larger amount of attribute information of the object. As a result, retrieval of information of objects clustered in a small region and of objects whose exact positions are uncertain can be facilitated.

The importance degree determining section may determine the importance degree of the object based on a distance between the gazing point and the object and a distance between the gazing point and the viewpoint.

Thus, in response to the manipulation of the 2D/3D graphics by the user, the object in the vicinity of the gazing point is displayed with a larger amount of the attribute information of the object. This means that the object in the vicinity of the gazing point is displayed with some sort of highlighting effect. As a result, retrieval of information of objects clustered in a small region and of objects whose exact positions are uncertain can be facilitated.

Further, the importance degree determining section may determine the importance degree of the object based on an importance degree of at least one object associated with the object, irrespective of the distance between the gazing point and the object. This also enables associative retrieval and discovery-oriented retrieval.

Furthermore, information of objects in the vicinity of the gazing point of the user that have high importance degrees is displayed with some sort of high-lighting effect, e.g., in different colors or with flickering. As a result, retrieval of information of objects clustered in a small region and of objects whose exact positions are uncertain can be facilitated.

By ensuring that only objects having high importance degrees are displayed while eliminating the other objects, it becomes even easier for the user to grasp the graphics compared to the case of objects displayed in different colors or flickering objects. As a result, retrieval of information of objects clustered in a small region and of objects whose exact positions are uncertain can be further facilitated.

Thus, the invention described herein makes possible the advantage of providing a database retrieval system which enables an easy and fast retrieval of information of objects clustered in a small region and of objects whose exact positions are uncertain.

These and other advantages of the present invention will become apparent to those skilled in the art upon reading and understanding the following detailed description with reference to the accompanying figures.

DESCRIPTION OF THE PREFERRED EMBODIMENTS

Hereinafter, an example of the present invention will be described with reference to the accompanying drawings.

The present invention is adapted to various kinds of applications. For example, the present invention is adapted to a system for displaying a map in a 2D or 3D form, and for guiding a desired area or region on the map. Hereinafter, the system is referred to as an area guidance system.

Figure 1:
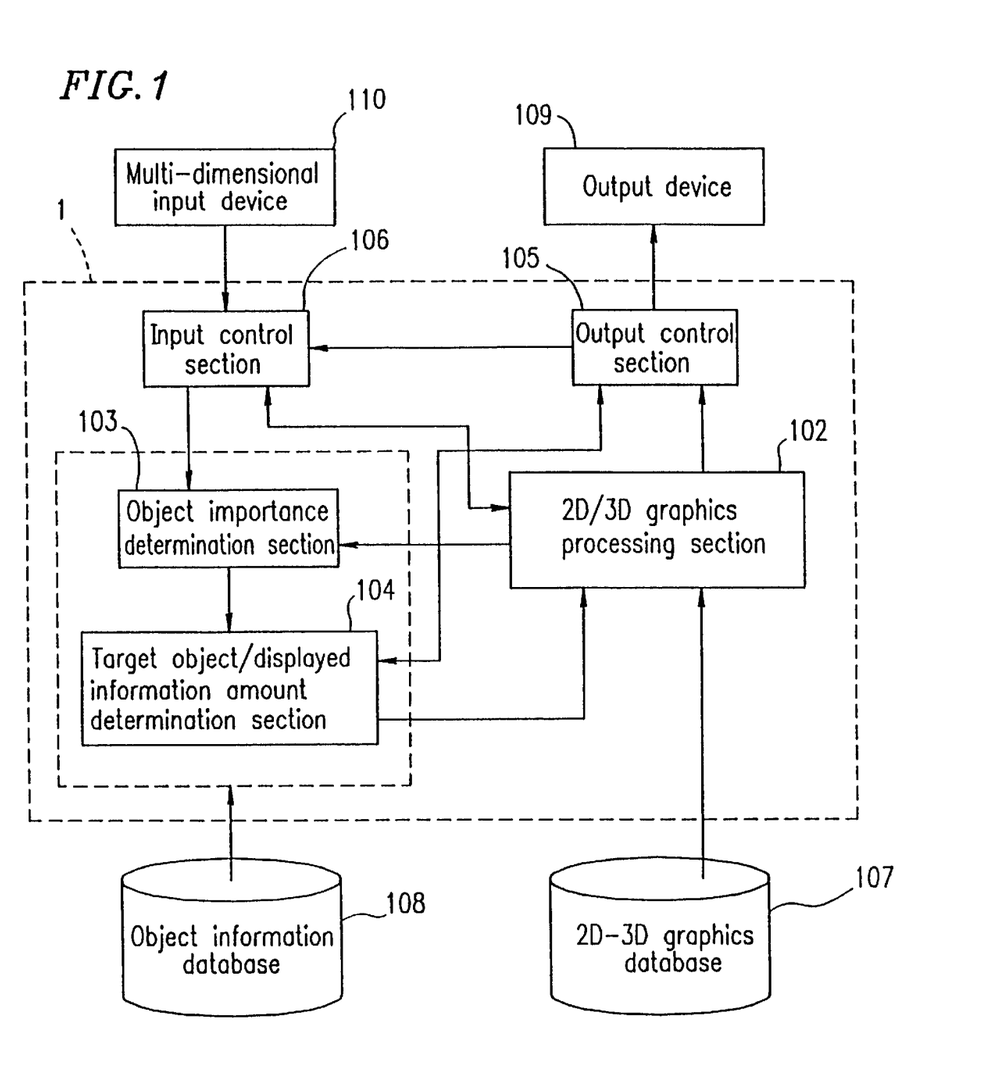
FIG. 1 is block diagram showing the electrical construction of a database retrieval system according to the present invention.

FIG. 1 shows an electrical configuration for the area guidance system.

As shown in FIG. 1, a main body 1 of the system includes a 2D/3D graphics processing section 102; an object importance determination section 103; a target object/displayed information amount determination section 104; an output control section 105; and an input control section 106.

The 2D/3D graphics processing section 102 generates a 2D or 3D graphic model.

The object importance determination section 103 determines an importance degree of the object based on an interaction between a user and the system.

The target object/displayed information amount determination section 104 determines objects whose information is to be displayed (hereinafter referred to as "target objects") and the amount of the information of the target objects to be displayed, based on the importance degrees of the objects determined by the object importance determination section 103.

The output control section 105 converts the graphic model generated by the 2D/3D graphics processing section 102 into graphics, which is capable of being displayed by an output device 109. In addition, the output control section 105 generates an output layout for the converted graphics and the information to be presented as determined by the target object/displayed information amount determination section 104.

The input control section 106 interprets an input operation which is input by a user from a multi-dimensional input device 110. The result of the interpretation of the input operation is supplied to the 2D/3D graphics processing section 102 and the object importance determination section 103.

In the above-described configuration, the 2D/3D graphics processing section 102, the output control section 105, and the input control section 106 constitute a display layout generating means capable of generating a display layout for arranging the objects and the attribute information of the objects.

Fundamental data of 2D/3D graphics is described in a 2D/3D graphics database 107. The information of objects to be retrieved is described in detail in an object information database 108.

The output device 109 and the multi-dimensional input device 110 ore devices which enable interaction between the present system and the user.

The output device 109 can be implemented as, for example, a CRT display, a liquid crystal display, or a 3D display. The output device 109 displays a display layout generated by the output control section 105.

The multi-dimensional input device 110 can be implemented as, for example, a 3D mouse, a joystick, a game controller, a sight line detection device, a head-mounted display, or a keyboard or a mouse of a common computer system or a combination thereof. The user conducts a retrieval by manipulating and controlling the graphics and object information displayed by the output device 109 by means of the multi-dimensional input device 110.

The main body 1 can be easily implemented as, for example, a personal computer, a work station, or a portable terminal device including a CPU, a memory, and the like.

The output device 109 and the multi-dimensional input device 110 can be combined as an integrated input/output device. For example, a liquid crystal tablet integrating a liquid crystal display and a pen input device such as a digitizer can be used as the integrated input/output device.

Next, the 2D/3D graphics database 107 and the object information database 108 will be described in detail.

Fundamental graphics date, such as the shape/coordinate data of objects to be retrieved and the shape/coordinate data of other components included in the graphics, is described in the 2D/3D graphics data-base 107. The 2D/3D graphics processing section 102 generates a graphic model by referring to the 2D/3D graphics database 107.

In the case where the 2D/3D graphics database 107 has a description format including divided regions, the 2D/3D graphics processing section 102 generates a graphic model based on graphics data described in an initial region which is previously set. In the case where the 2D/3D graphics database 107 has a hierarchial description format, the 2D/3D graphics processing section 102 generates a graphic model based on graphics data described in a predetermined level which is previously set.

Herein, a "graphic model" is, for example, defined as a wire frame model, a solid model, or the like. Those which are obtained by subjecting such models to processes such as rendering, shading, coloring or texture mapping are also encompassed by "graphic models" as defined herein.

If the scale of the graphics generated by the 2D/3D graphics processing section 102 becomes too large, the system becomes inefficient in terms of processing time. In such cases, the graphics are divided into smaller data regions so that the shape/coordinate data of each region and the relationship indicating regions adjoined by that region are described in the 2D/3D graphics database 107. Thus, only the necessary regions of the graphics are generated by the 2D/3D graphics processing section 102.

Alternatively, a hierarchial description format can be adopted for the 2D/3D graphics database 107 which enhances the resolution of the graphics in accordance with the zooming degree of the graphics.

Object information indicates information relating to an individual object to be retrieved. The object information is described in the object information database 108.

Herein, "object information" is defined as attribute information defining attribute or characteristics of the object. For example, the attribute information includes a name of the object and a location of the object in the 2D/3D graphics. The attribute information also includes text information and media information such as audio information, still picture information or moving picture information. Audio Information and video information are likely to be in different data formats from the data format of text data, and such data is likely to have a large data length. Therefore, such data can be stored in different storage areas of the database. In that case, pointers to storage areas accommodating such media information can be utilized as data included in the object information.

The object information may include a pointer to an object relating to the subject object and a pointer to an object which is conceptually superior or inferior to the subject object. This makes it possible to establish a network of the objects.

Next, the interactions between the present system and a user will be described with respect to an exemplary display layout shown in FIGS. 2 and 3. Such a display layout is displayed on the output device 109, The display layout shown in FIGS. 2 and 3 includes a graphics display section 201, an information display section 202, and a keyword input section 203. A cursor 204 indicating the gazing point of the user is also displayed.

In the graphics display section 201, the graphics are displayed. The graphics are generated by the 2D/3D graphics processing section 102 and converted by the output control section 105 into graphics having a format which is displayable by the output device 109. The user moves the viewpoint and the gazing point in the graphics by operating the multi-dimensional input device 110.

Figure 5:
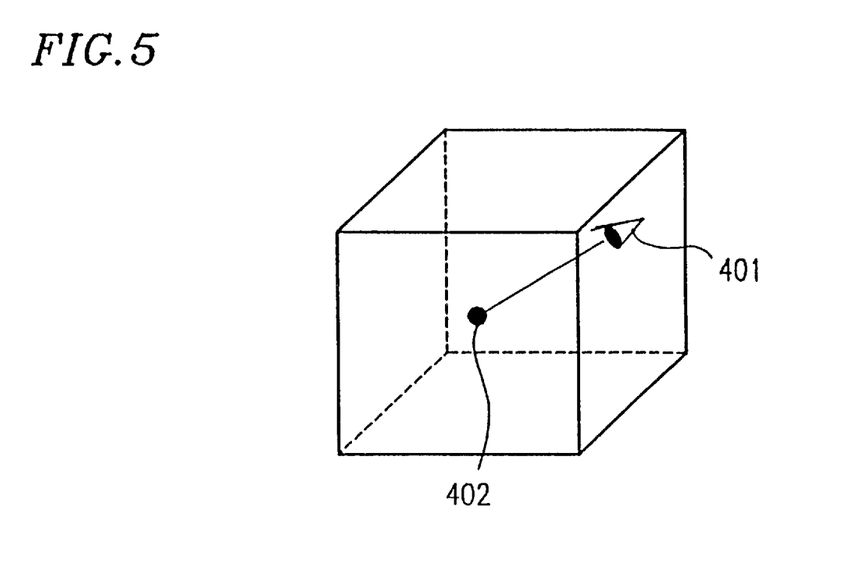
FIG. 5 is a diagram showing the relationship between the viewpoint and the gazing point of a user in a graphic model.

FIG. 5 shows the relationship between a viewpoint 401 and a gazing point 402 in a graphic model. The graphics displayed in the graphics display section 201 are viewed from the viewpoint 401. The cursor 204 displayed in the graphics display section 201 corresponds to the gazing point 402. In the case where the output device 109 is a 2D display, the graphic model can be converted into 2D graphics (i.e., by placing the graphics in perspective) so as to be displayed by the output device 109.

Figure 2:
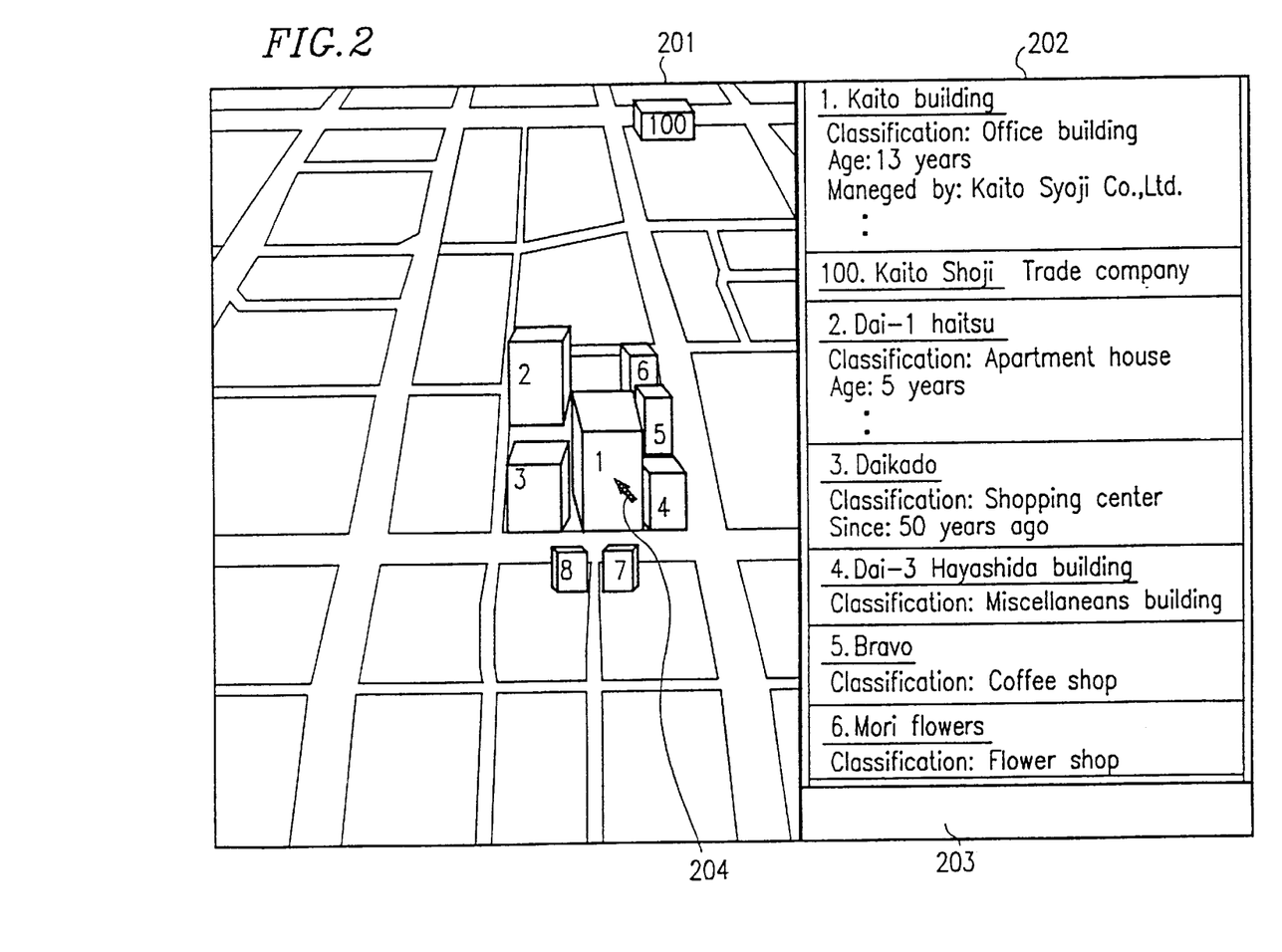
FIG. 2 is a diagram showing an exemplary display layout.
Figure 3:
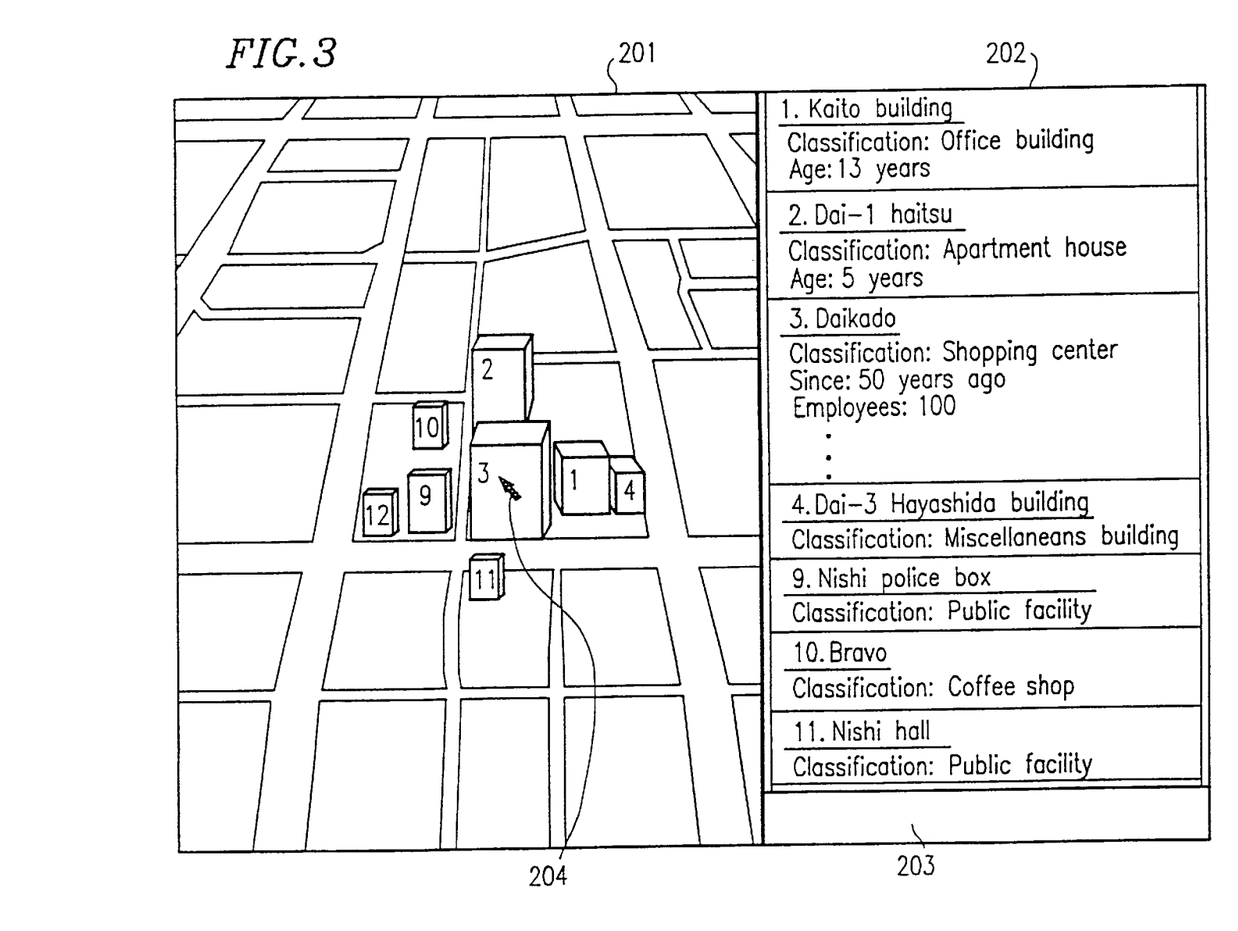
FIG. 3 is a diagram showing a display layout in the case where the cursor has been moved toward left in the display layout shown in FIG. 2.

In the exemplary display layout shown in FIGS. 2 and 3, the positions of target objects, i.e., objects whose information is to be retrieved, are indicated by cubic marks. The size of the cubic marks is proportional to the amount of the displayed information. Any objects other than the target objects ere not displayed. Thus, the target objects, whose information is currently displayed, are clearly distinguishable from the other objects, whose information is not currently displayed. This provides the advantage of ensuring that the user does not receive any visual information of irrelevant objects.

Alternatively, the outlines of all the objects may be displayed. In this case, the target objects, whose information is currently displayed, may be displayed in a color (or colors) different from the colors of the other objects, whose information is not currently displayed. It is also possible that the target objects may be flickered, while the other objects are not flickered. Thus, the target objects, whose information is currently displayed, can be clearly distinguished from the other objects, whose information is not currently displayed.

In the information display section 202, the attribute information of the target objects, whose information is currently displayed, is displayed with the amount defined by the importance degrees (described later) of the target objects. A region for displaying information on the information display section 202 is assigned to each target object in accordance with the information amount determined by the target object/displayed information amount determination section 104.

In this exemplary display layout, different numbers are assigned to respective target objects in order to clarify the corresponding relationship between the marks of the target objects displayed in the graphics display section 201 and the information of the target objects displayed in the information display section 202. Alternatively, such a correspondence relationship may be clarified by assigning different colors to respective target objects, for example.

When the information of a particular object is selected in the information display section 202, the importance degree of the object is increased, so that the amount of the displayed information of the object is increased accordingly. It is possible to perform operations such as scroll and zoom in the graphics display section 201, as the amount of the displayed information of the object is increased in the information display section 202.

Through the keyword input section 203, the user inputs the name of a particular object, the name of a particular attribute, or the like as a retrieval keyword. It is possible to conduct a further retrieval for screening purposes by using keywords which are input via the keyword input section 203.

For example, if the user inputs the name of an object as a retrieval keyword, the information of the object is displayed in the information display section 202, and the graphics display section 201 scrolls the graphics to the position where the object is located. In the case where the user desires to conduct a retrieval for only particular attribute information item of the object information, the user can input a keyword concerning that attribute information item, thereby conducting a screening retrieval limited to the attribute information item.

FIG. 3 shows a state where the cursor has been moved toward the left in the display layout displayed by the graphics display section 201 shown in FIG. 2.

In FIG. 2, the cursor 204, which indicates the gazing point of the user, is located at the object labeled with the number "1". The object importance determination section 103 increases the importance degree of the object indicated by the cursor 204. As a result, the size of the cubic mark of the object is increased. The object importance determination section 103 also increases, to some extent, the importance degree of the objects in the vicinity of the object indicated by the cursor 204. Thus, respective pieces of attribute information of the objects are displayed in the information display section 202 in accordance with their importance degrees.

Specifically, in FIG. 2, the attribute information of the graphic (mark) 1 is displayed in a relatively large amount, while that of the graphics (marks) 4, 5, and 6 is displayed in a relatively small amount. Since there is an association link between the object 1 and an object 100 located at a particular distance from the object 1 (i.e., both the objects have the name "Kaito" in common), the information of the object 100 is also indicated.

On the other hand, in FIG. 3, the cursor 204 indicating the gazing point of the user is shifted toward the left so that the importance degree of the object 3 is increased (resulting in a large cubic mark), and the importance degree of the object 1 is decreased (resulting in a somewhat smaller cubic mark). As the cursor 204 is moved from the object 1 to the object 3, the importance degree of the object 100 is decreased so that the object 100 is no longer displayed.

As the cursor 204 is moved from the object 1 to the object 3, in the information display section 202, the attribute information of the object 3 is increased in amount, whereas the attribute information of the object 1 is somewhat decreased. The attribute information of the object 100 is not displayed.

Thus, one important feature of the present invention is that the importance degrees of the objects are varied based on an interaction between the user and the system. The importance degree of the object represents a degree defining how the object is to be displayed. In the present invention, the interaction between the user and the system is defined as an input from the user to the system and an output from the system in response to the input. Such an interaction is made by, for example, moving the gazing point and the viewpoint of the user in the graphics, by selecting objects, and by screening objects using retrieval keywords. The amount of information to be displayed is varied accordingly.

Figure 4:
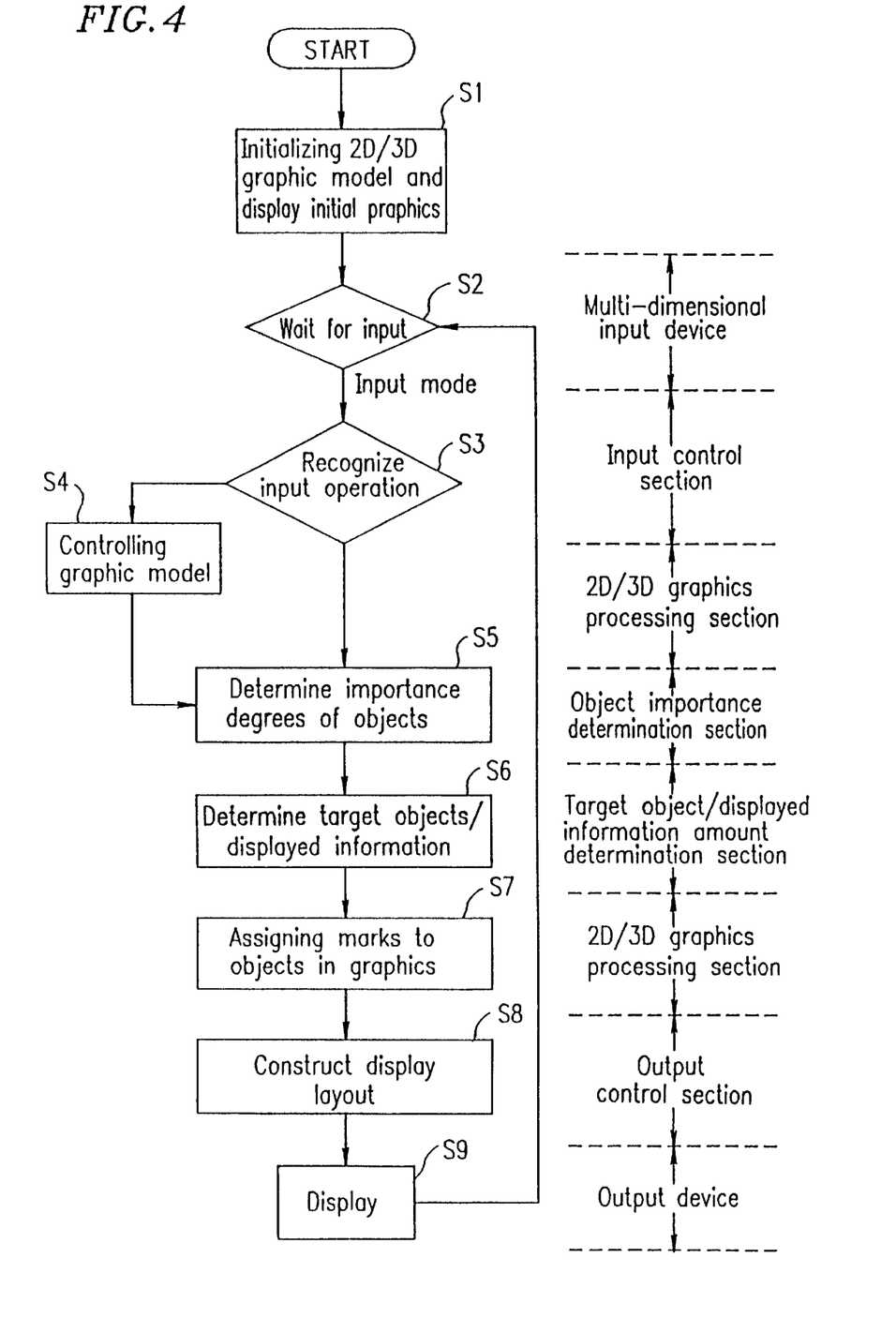
FIG. 4 is a flowchart describing the operation of a database retrieval system according to the present invention.

Next, the operation of the system of the present example will be described with reference to a flowchart shown in FIG. 4.

Step S1: First, the 2D/3D graphics processing section 102 generates an initial graphic model by referring to the 2D/3D graphics database 107, and stores the generated graphic model. The output control section 105 converts the initial model into graphics having a format which is displayable by the output device 109. Thus, an initial image is displayed in accordance with the predetermined display layout (see, FIG. 2).

Step S2: A process begins based on the interaction with a user. In other words, the system waits for an input from the user via the multi-dimensional input device 110.

Herein, the input from the user should be interpreted to include an operation made in each dimension (2D/3D) of the multi-dimensional input device 110 or a combination of dimensions. The input is assigned with functions such as moving the viewpoint and the gazing point of the user and selection of objects In the graphics. The user inputs such desired processes to the system via the multi-dimensional input device 110.

Step S3: The system recognizes the input operation made by the user based on input date from the user which is received at the input control section 106, the current display layout, and the state of the graphic model. The input operation as used herein includes the moving of the viewpoint and the gazing point of the user and selection of objects in the graphics, selection of objects in the information display section 202, and an instruction for a screening retrieval using input keywords.

Among the above-mentioned input operations, the moving of the viewpoint and the gazing point of the user in the graphics is achieved by detecting the directions and amount of the movement of the user's viewpoint and gazing point while referring to the graphic model generated by the 2D/3D graphics processing section 102. Since the selection of objects can be considered as an extension of the movement of the user's viewpoint and the gazing point, the selection of objects will be processed as a movement of the user's viewpoint and the gazing point in the following steps.

In Step S3, it is determined whether the input operation by the user is directed to moving the viewpoint and the gazing point in the graphics or to a screening retrieval. If the user has instructed to move the viewpoint and the gazing point in the graphics, the process proceeds to Step S4. If the input operation by the user is directed to a screening retrieval, the process proceeds to Step S5.

Step S4: The 2D/3D graphics processing section 102 changes the user's viewpoint and gazing point in the graphic model based on the direction and amount of movement of the viewpoint and the gazing point as detected by the input control section 106.

When the viewpoint and the gazing point travel outside the graphic model, the following operation is made by the system depending on whether the 2D/3D graphics database 107 is divided into small regions or has a hierarchial structure.

If the 2D/3D graphics database 107 is divided into small regions, data of the next region (based on the relationship indicating regions adjoining one another) is read from the 2D/3D graphics database 107, and a graphic model is regenerated. No graphic model is regenerated unless the viewpoint and the gazing point go outside the graphic model.

If the 2D/3D graphics database 107 has a hierarchial structure, the hierarchial level of the graphics, i.e., resolution, of the graphics is switched in accordance with the distance between the viewpoint and the gazing point.

Step S5: The respective importance degrees of the objects are calculated by the object importance determination section 103 based on the current viewpoint and the gazing point of the user in the graphic model. The main purpose of the importance degree calculation is to increase the importance degree as the object is located closer to the gazing point of the user and also to increase the importance degrees of objects associated with such an object.

The calculation of the importance degree $W^i$ for an object i is made in accordance with the following Expression (1):

$$W^i = f(d_{F-i}) + R^i = (ad_{F-i} + b) + R^i \qquad \text{Expression (1)}$$

where $d_{F-i}$ denotes a distance between the gazing point 402 (the cursor 204) and the object i; $R^i$ denotes a propagation of the importance degree from the linked object to the object i; and a and b denotes an integer.

Figure 6:
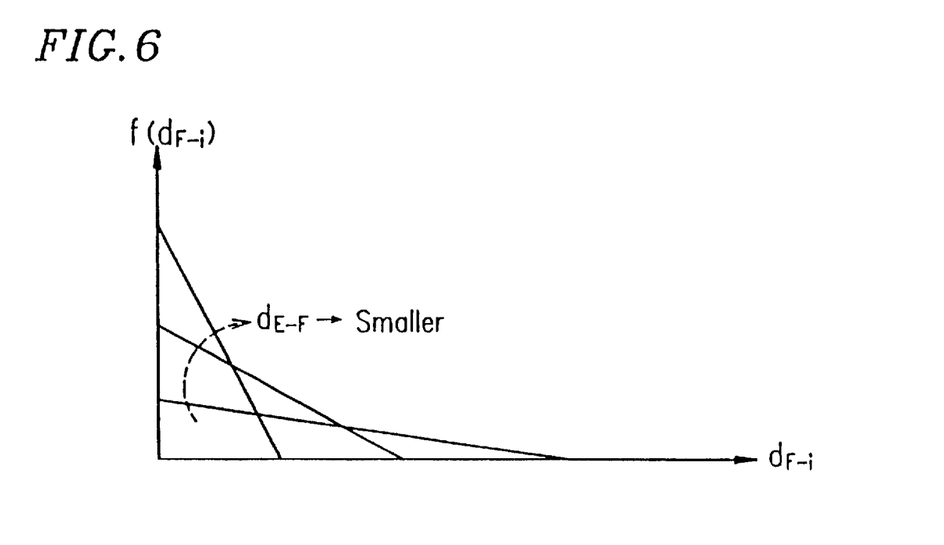
FIG. 6 is a graph illustrating a function defining importance degrees of objects.

The function $f(d_{F-i})$ is a function illustrated in FIG. 6. It is assumed that $f(d_{F-i})$ becomes zero where the importance degree $W^i$ may take a negative value.

As shown in FIG. 6, the coefficients a and b of the function $f(d_{F-i})$ in themselves are functions of the distance $d_{E-F}$ between the viewpoint 401 and the gazing point 402. Specifically, as the distance $d_{E-F}$ increases, objects in a larger area around the gazing point 402 (cursor 204) receive a smaller increase in their respective importance degrees (so as to take small plus values), On the contrary, as the distance $d_{E-F}$ decreases, objects in e smaller area around the gazing point 402 (cursor 204) receive a larger increase in their respective importance degrees.

In Step S3, if the input operation is determined to be directed to a screening retrieval, only the objects which include the input keywords as object information are subjected to an importance degree calculation. The importance degrees $W^i$ of other objects are set to be zero.

The propagation $R^i$ indicates what percentage of the importance degree of the linked object is propagated to the object i. In the case where a plurality of objects are linked to the object i, a certain percentage of the importance degree of a representative object is propagated to the object i. For example, the object having a maximum value is selected as the representative object among the linked objects.

Step S6: The target object/displayed information amount determination section 104 determines the object whose attribute information is to be displayed and the amount of information relating to the object to be displayed, based on the importance degrees determined by the object importance determination section 103 by referring to the object information database 108.

Basically, objects whose importance degrees $W^i > 0$ are determined to be target objects. The amount of information of each object to be displayed is determined in accordance with its importance degree.

The determination of displayed information is made as follows. Different priorities are previously assigned to various items of object information (e.g., names of objects, attribute information, media information, and the like). The displayed information is determined based on such priorities and the importance degrees, relative to the space available in the information display section 202 shown in FIG. 2.

Step S7: The 2D/3D graphics processing section 102 assigns marks to target objects, i.e., objects whose information have been determined to be displayed. As for a method of mark assignment, the target objects can be indicated by cubic marks as shown in FIG. 2, but the target objects can also be indicated in the form of graphic representations in different colors from the colors of other objects.

In the case where the graphics display section 201 and the information display section 202 are separate from each other, it is also possible to assign corresponding reference numerals and/or colors to objects in both sections so as to clarify the correspondence between the graphics display section 201 and the information display section 202.

The output control section 105 converts the graphic model generated by the 2D/3D graphics processing section 102 into graphics having a format displayable by the output device 109.

Step S8: A display layout, such as that shown in FIG. 2, is constructed from the converted graphics and the displayed information as determined by the target object/displayed information amount determination section 104.

Step S9: The constructed display layout is displayed by the output device 109.

The user may proceed with the retrieval process by repeating the process from Steps S2 through Step S9 as described above.

Thus, as a user manipulates 2D/3D graphics, the information of objects in the vicinity of the gazing point of the user is displayed with some sort of high-lighting effect, and the attribute information of such objects is displayed in a great amount. As a result, retrieval of information of objects clustered in a small region and of objects whose exact positions are uncertain can be facilitated.

Further, as a user manipulates 2D/3D graphics, the information of objects in the vicinity of the gazing point of the user and the information of associated objects are displayed, and the attribute information of such objects is displayed in a great amount. As a result, retrieval of information of objects clustered in a small region and of objects whose exact positions are uncertain can be facilitated. This also enables associative retrieval and discovery-oriented retrievals Furthermore, information of objects in the vicinity of a gazing point of the user that have high importance degrees is displayed with some sort of high-lighting effect, e.g., in different colors or with flickering, so that retrieval of information of objects clustered in a small region and of objects whose exact positions are uncertain can be facilitated.

By ensuring that only objects having high importance degrees are displayed while eliminating the other objects, it becomes even easier for the user to utilize and understand the graphics compared to the case of objects displayed in different colors or flickering objects.

As a result, retrieval of information of objects clustered in a small region and of objects whose exact positions are uncertain can be further facilitated.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A system for retrieving and displaying attribute information of an object, comprising:
   detecting means for detecting an interaction between a user and the system, wherein the interaction includes the user gazing from an effective viewpoint at a gazing point on a display, and the detecting means detecting a relative movement between the viewpoint and gazing point;
   importance degree determining means for determining an importance degree of the object based on the interaction detected by the detecting means;
   object determining means for determining whether the attribute information of the object is to be displayed and an amount of the attribute information of the object which is to be displayed in accordance with the importance degree of the object;
   display layout generating means for generating a display layout for arranging the attribute information of the object in accordance with a result of the determination by the object determining means; and
   display means for displaying the attribute information of the object based on the display layout.

2. A system according to claim 1, wherein the detecting means detects retrieval information, the importance degree determining means changes the importance degree of the object in accordance with the detected retrieval information.

3. A system according to claim 1, wherein the display layout generating means generates information for changing a size of a region in which the attribute information of the object is to be displayed in accordance with the amount of the attribute information of the object determined by the object determining means, and in accordance with the interaction detected between the user and the system.

4. A system for retrieving and displaying attribute information of an object, comprising:
   detecting means for detecting an interaction between a user and the system;
   importance degree determining means for determining an importance degree of the object based on the interaction detected by the detecting means;
   object determining means for determining whether the attribute information of the object is to be displayed and an amount of the attribute information of the object which is to be displayed in accordance with the importance degree of the object;
   display layout generating means for generating a display layout for arranging the attribute information of the object in accordance with a result of the determination by the object determining means;
   display means for displaying the attribute information of the object based on the display layout, and
   wherein the detecting means detects movements of a viewpoint and a gazing point, the importance degree determining means changes the importance degree of the object in accordance with the detected movements of the viewpoint and the gazing point.

5. A system according to claim 4, wherein the importance degree determining means determines the importance degree of the object as a function of a distance between the gazing point and the object.

6. A system according to claim 5, wherein the function is given as a function of a distance between the viewpoint and the gazing point.

7. A system for retrieving and displaying attribute information of an object, comprising:
   detecting means for detecting an interaction between a user and the system, wherein the interaction is between an effective viewpoint of the display and a gazing point on a display, and the detecting means detects a relative movement between the viewpoint and gazing point;
   importance degree determining means for determining an importance degree of the object based on the interaction detected by the detecting means;
   object determining means for determining whether the attribute information of the object is to be displayed and an amount of the attribute information of the object which is to be displayed in accordance with the importance degree of the object;
   display layout generating means for generating a display layout for arranging the attribute information of the object in accordance with a result of the determination by the object determining means;
   display means for displaying the attribute information of the object based on the display layout, and
   wherein the importance degree determining means determines the importance degree of the object as a function of an importance degree of at least one object relating to the object.

8. A system for retrieving and displaying attribute information of an object, comprising:
   detecting means for detecting an interaction between a user and the system;
   importance degree determining means for determining an importance degree of the object based on the interaction detected by the detecting means;
   object determining means for determining whether the attribute information of the object is to be displayed and an amount of the attribute information of the object which is to be displayed in accordance with the importance degree of the object;
   display layout generating means for generating a display layout for arranging the attribute information of the object in accordance with a result of the determination by the object determining means;
   display means for displaying the attribute information of the object based on the display layout, and
   wherein the display layout generating means generates information for changing a displayed characteristic of the object depending on the attribute information of the object.

9. A system according to claim 8, wherein the display layout generating means generates information for changing a color of the object in accordance with whether the attribute information of the object is to be displayed.

10. A system according to claim 8, wherein the display layout generating means generates information for blinking the object whose attribute information is to be displayed.

11. A system according to claim 8, wherein the display layout generating means generates information for displaying the object whose attribute information is to be displayed, exclusive of the object whose attribute information is not to be displayed.

12. A method for retrieving and displaying attribute information of an object image displayed on a display, comprising the steps of:

(a) generating a screen image and a pointing icon, and displaying the screen image and the pointing icon on the display;

(b) moving the pointing icon on the screen image in accordance with a signal from a user input device which is operated by a user;

(c) displaying an object image on the screen image;

(d) assigning an importance degree to the object image based on at least a location of the pointing icon on the screen image relative to the icon;

(e) determining whether the object image is to be displayed on the screen image in accordance with the importance degree assigned to the object image; and (f) changing the importance degree assigned to the object image in response to a movement of the pointing icon relative to the object image.

13. A method according to claim 12, further comprising the step of:

(g) enlarging the object image on the screen image in accordance with the importance degree assigned to the object image, and when the icon is near the object image.

14. A method according to claim 12, further comprising the step of:

(g) displaying text information relating to the object image on the screen image, where an amount of the text information displayed depends on the importance degree assigned to the object image.

15. A method according to claim 12, wherein the object image which has been determined to be displayed on the screen image in stop (e) includes an object image which is not displayed during step (b).

16. A system for retrieving and displaying attribute information of an object comprising:

a processor for generating a screen image, an object image and a pointing icon;

a display connected to the processor, for displaying the screen image, the object image and the pointing icon;

a user input device connected to the processor, for converting a user's action to an input signal and inputting the input signal to the processor, where the processor moves the pointing icon on the screen image in accordance with the input signal; and a memory device connected to the processor, the memory device including an object information database which stores data representing the object image and a location of the object image on the screen image, and a graphics database which stores data for generating the screen image;

wherein the processor, executes a program including the steps of assigning an importance degree to the object image based on at least a location of the pointing icon on the screen image, and determining whether the object image is displayed on the screen image in accordance with the importance degree which has been assigned to the object image.

\* \* \* \* \*